US011215052B2

(12) United States Patent
 Pelletier et al.

(10) Patent No.: US 11,215,052 B2
(45) Date of Patent: Jan. 4, 2022

(54) DETERMINATION OF PORE SIZE DISTRIBUTION OF RESERVOIR ROCK

(71) Applicant: Halliburton Energy Services, Inc., Houston, TX (US)

(72) Inventors: Michael T. Pelletier, Houston, TX (US); Li Gao, Katy, TX (US); Megan Renee Pearl, Spring, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 307 days.

(21) Appl. No.: 16/324,382

(22) PCT Filed: Dec. 21, 2016

(86) PCT No.: PCT/US2016/068046
 § 371 (c)(1),
 (2) Date: Feb. 8, 2019

(87) PCT Pub. No.: WO2018/118044
 PCT Pub. Date: Jun. 28, 2018

(65) Prior Publication Data
 US 2019/0316466 A1    Oct. 17, 2019

(51) Int. Cl.
 *E21B 49/00*    (2006.01)
 *E21B 49/02*    (2006.01)
 *G01N 15/08*    (2006.01)

(52) U.S. Cl.
 CPC ............ *E21B 49/008* (2013.01); *E21B 49/02* (2013.01); *G01N 15/0806* (2013.01); *G01N 15/088* (2013.01)

(58) Field of Classification Search
 CPC ........ E21B 49/008; E21B 49/02; E21B 47/11; G01N 15/0806; G01N 15/088
 See application file for complete search history.

(56) References Cited

U.S. PATENT DOCUMENTS 5,156,039 A * 10/1992 Giddings ........... G01N 30/0005
  73/865.5
2008/0149819 A1   6/2008 Zhdaneev
(Continued)

FOREIGN PATENT DOCUMENTS

WO   2018118044 A1   6/2018

*Primary Examiner* — Xin Y Zhong
(74) *Attorney, Agent, or Firm* — John W. Wustenberg; Parker Justiss, P.C.

(57) ABSTRACT

This disclosure provides a method of determining a pore throat size distribution of reservoir rock, comprising injecting a set of different-sized probe particles through a portion of reservoir rock and measuring retention volumes or times of each of the different-sized probe particles eluting from the portion of reservoir rock. This disclosure also provides a testing apparatus comprising a probe tube for receiving a set of different-sized probe particles in an elution fluid returning from a portion of reservoir rock and an analytical module connected to receive the elution fluid from the probe tube. The module includes a flow cell to receive the elution fluid from the probe tube, a radiation source positioned to direct a radiation beam though a window of the cell into the eluting fluid in the cell, and a sensor for detecting portions of the radiation beam that have interacted with the different-sized probe particles such that retention volumes or times each of the probe particles of one size class can be distinguished from all other size classes of the set.

19 Claims, 7 Drawing Sheets

(56) References Cited

U.S. PATENT DOCUMENTS

| | | |
|---|---|---|
| 2009/0047181 A1 | 2/2009 | Torgersen et al. |
| 2014/0000357 A1* | 1/2014 | Pissarenko ............ E21B 49/008 73/152.41 |
| 2015/0361791 A1 | 12/2015 | Gisolf et al. |

* cited by examiner

DETERMINATION OF PORE SIZE DISTRIBUTION OF RESERVOIR ROCK

CROSS-REFERENCE TO RELATED APPLICATION

This application is the National Stage of, and therefore claims the benefit of, International Application No. PCT/US2016/068046 filed on Dec. 21, 2016, entitled "DETERMINATION OF PORE SIZE DISTRIBUTION OF RESERVOIR ROCK," which was published in English under International Publication Number WO 2018/118044 on Jun. 28, 2018. The above application is commonly assigned with this National Stage application and is incorporated herein by reference in its entirety.

BACKGROUND

An important physical property of the reservoir rock affecting the production and economic viability of reservoir extraction operations is the distribution of pore sizes in the rock. Typically the pore size distribution is determined by extracting cores from the reservoir for laboratory analysis. The cores may be subjected to cleaning and surface analyses such as mercury injection porosimetry or to destructive modification into optical petrology slides for analysis by point counting geometric features as a metric for statistics on thin sections to assign pore body dimensions and pore throat distribution to the sample.

These analytical approaches can have deficiencies including, high costs associated with coring, long times required for analysis in labs, and unreliability, for example, due to undesirable alterations to cores or the selection of non-representative core samples. Therefore, there is a continuing need to improve methods and apparatuses for determining the pore size distribution of reservoir rock.

BRIEF DESCRIPTION

Figure 1A:
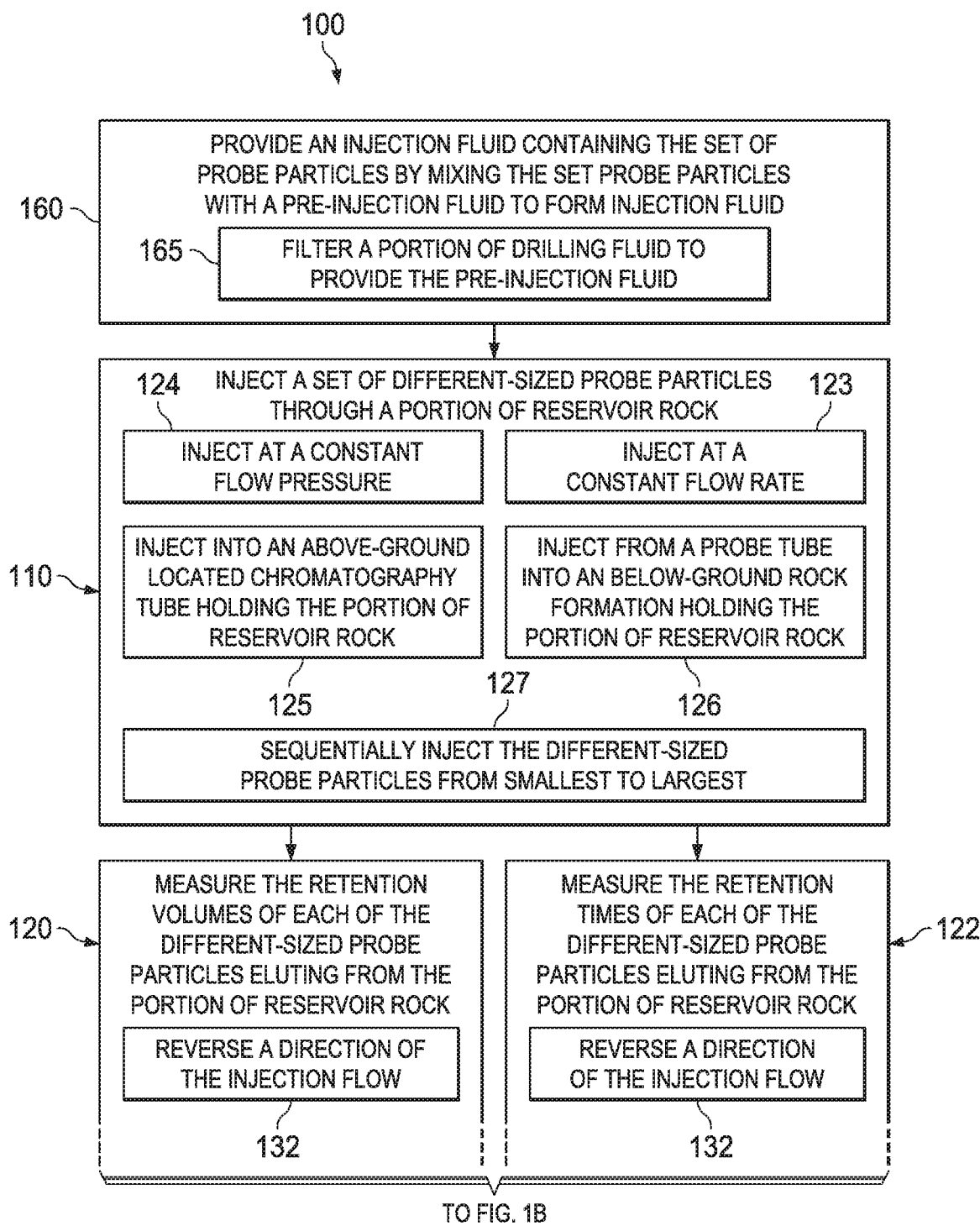
Figure 1B:
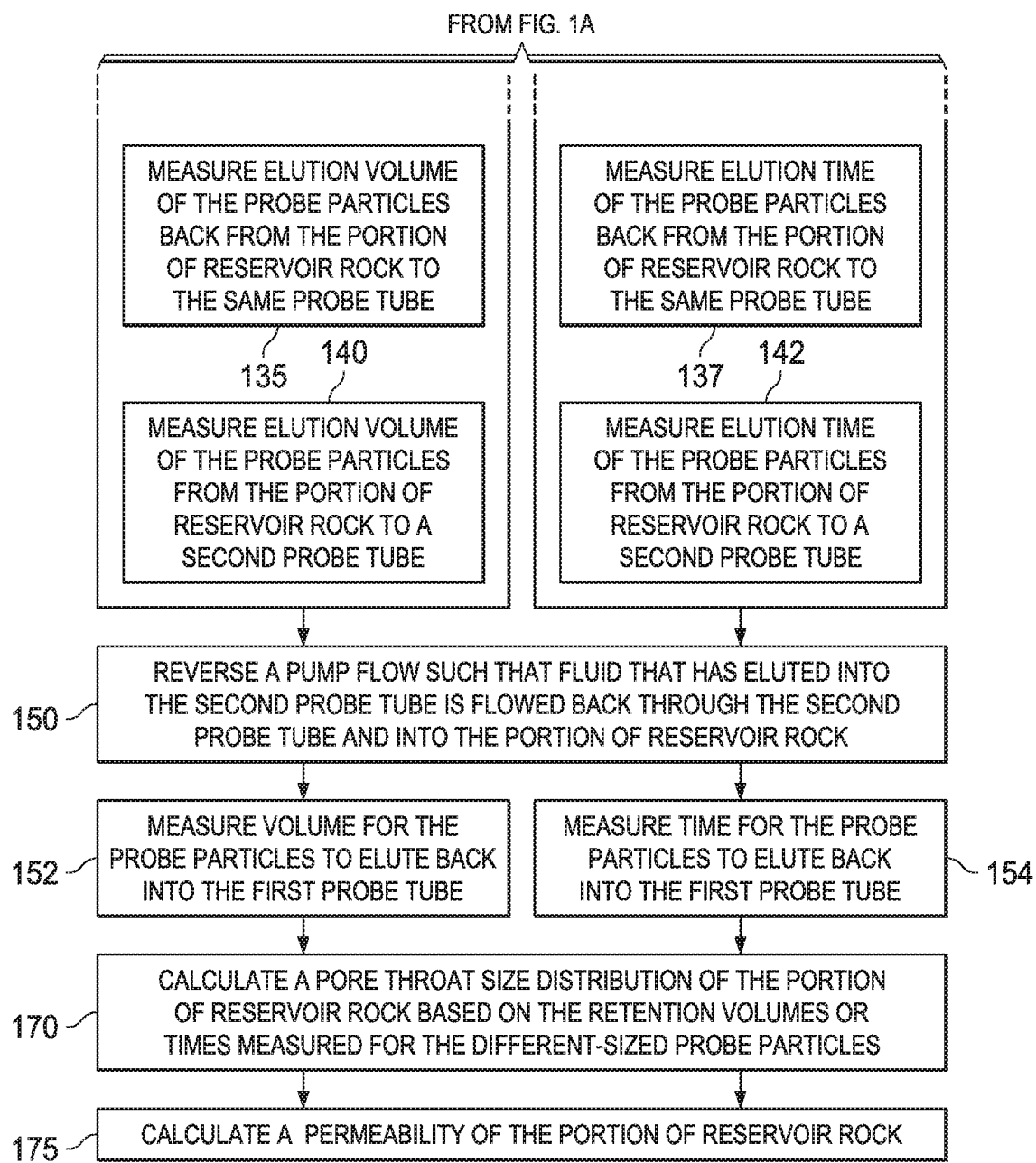
Figure 2:
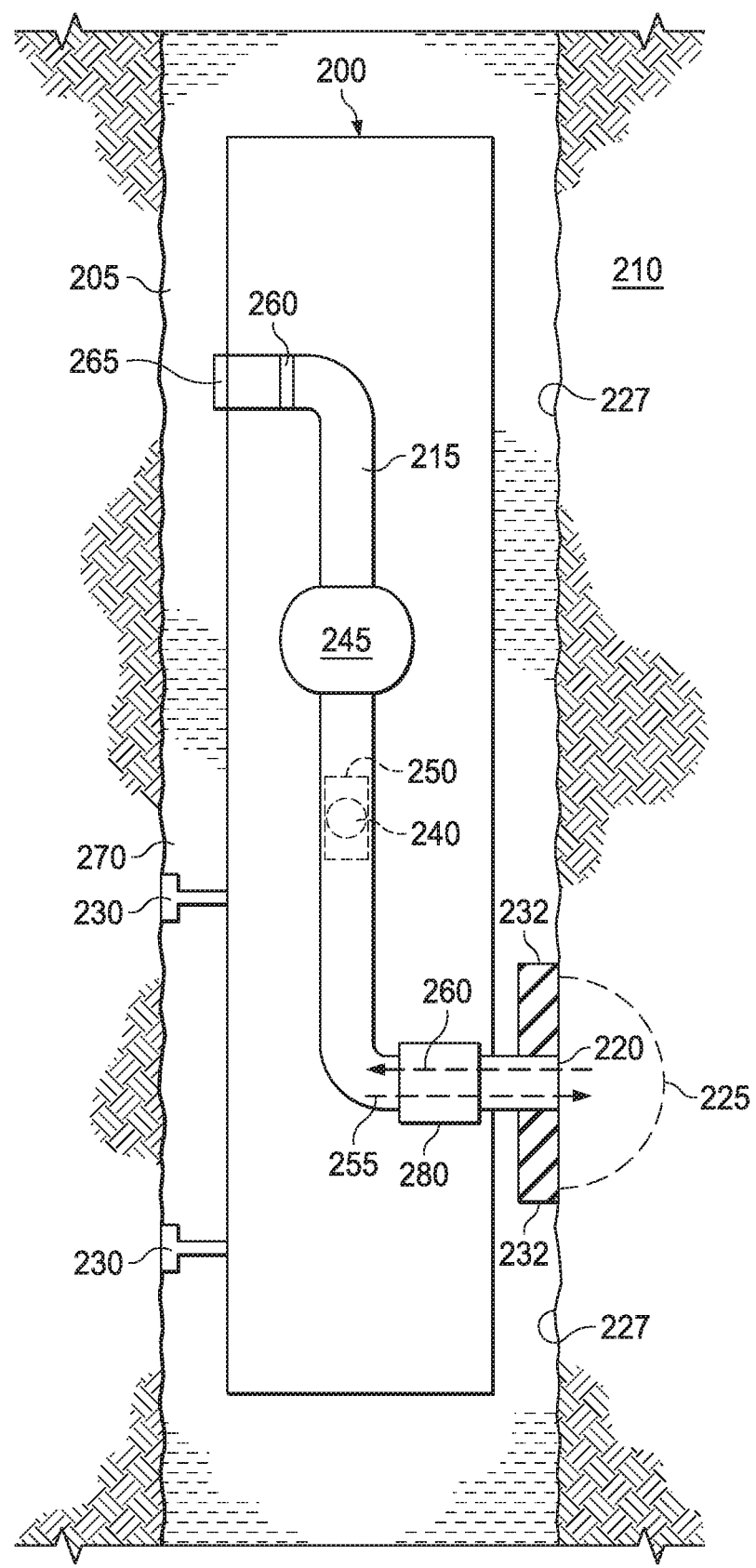
Figure 3:
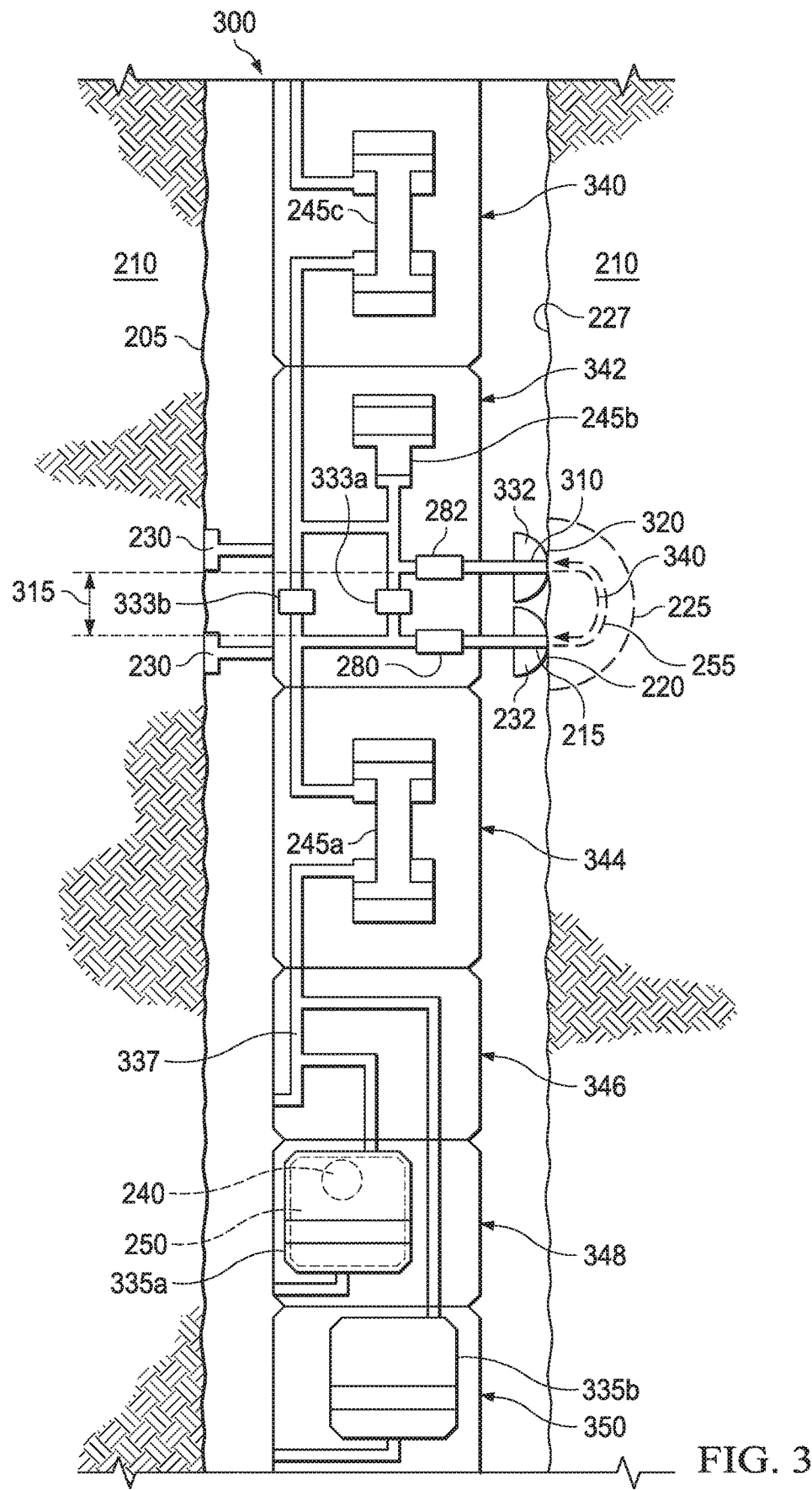
Figure 4:
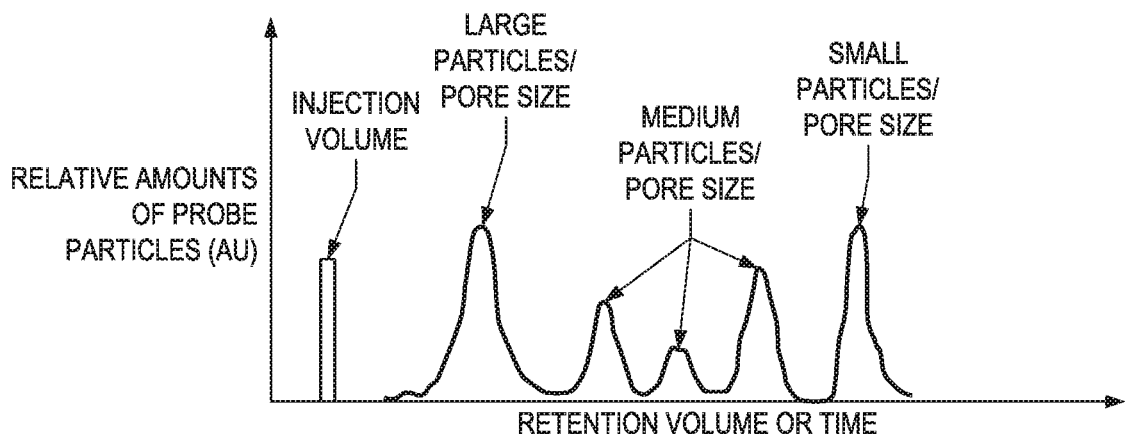
Figure 5:
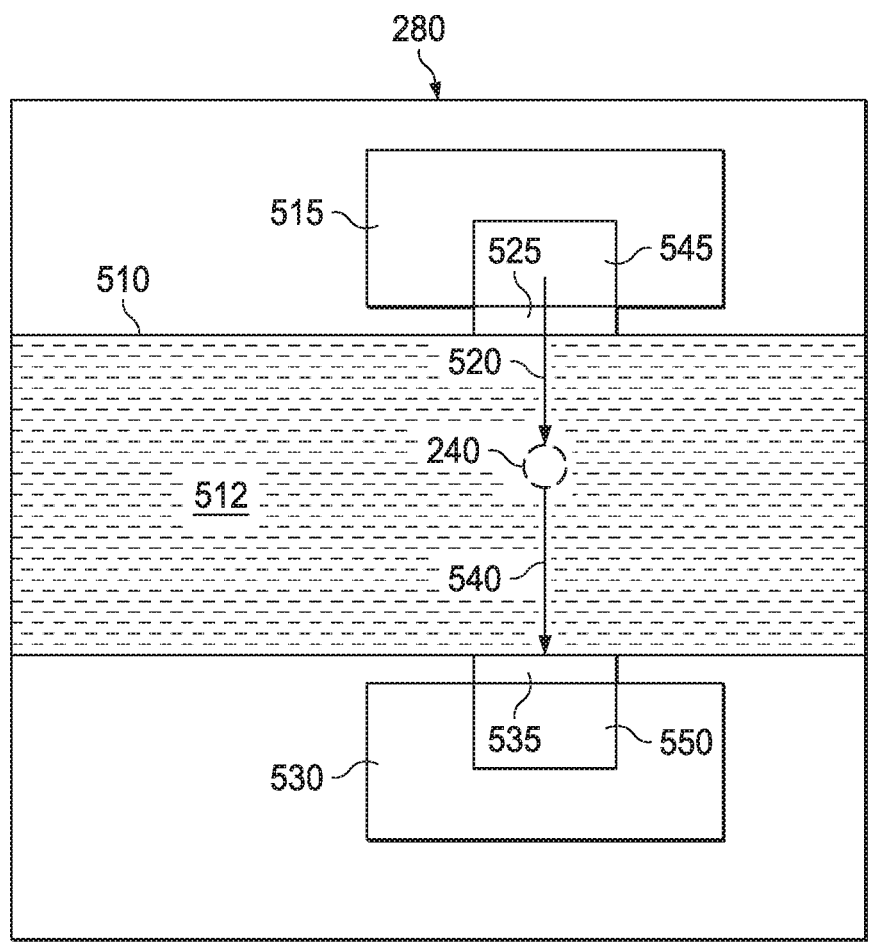
Figure 6:
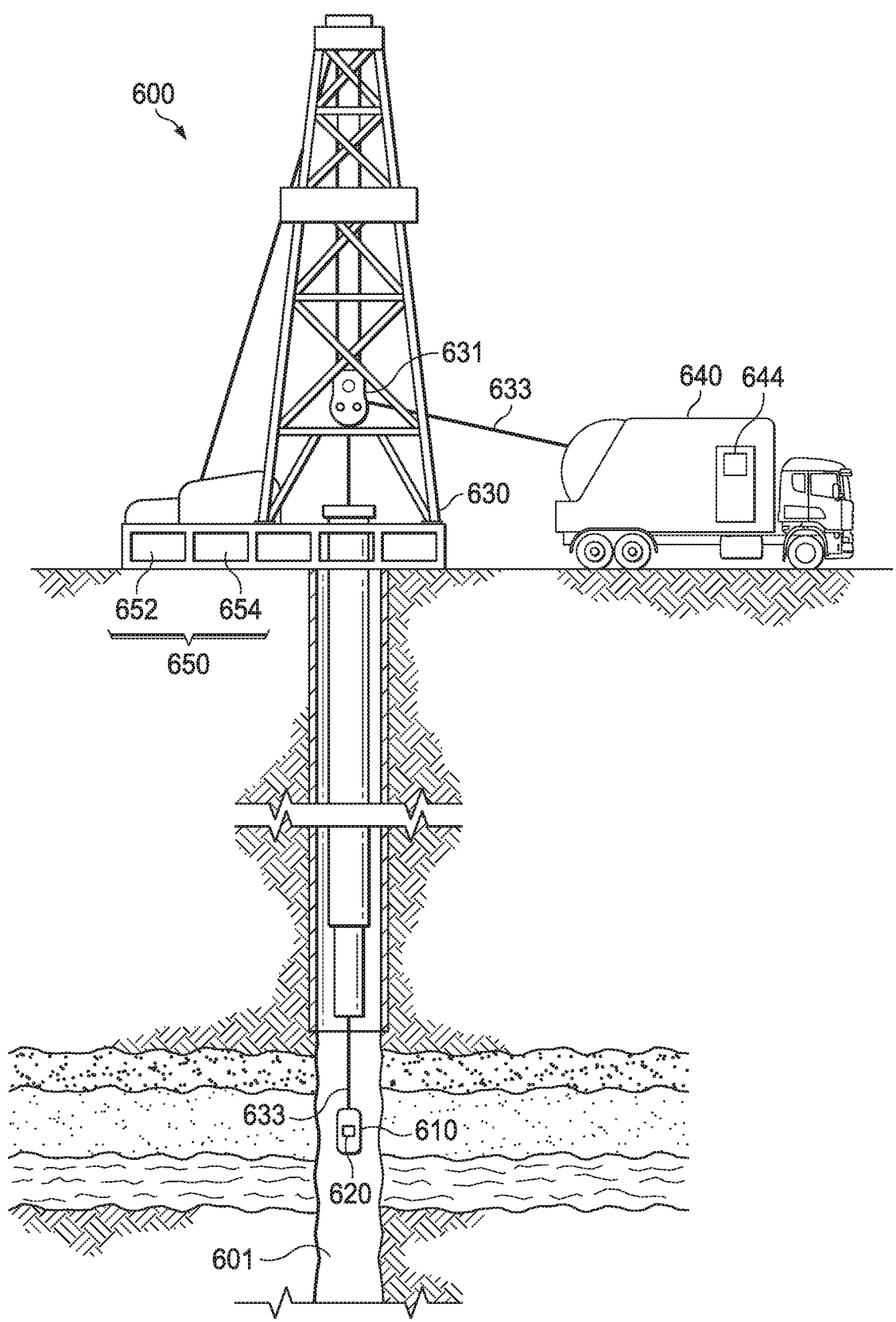
Figure 7:
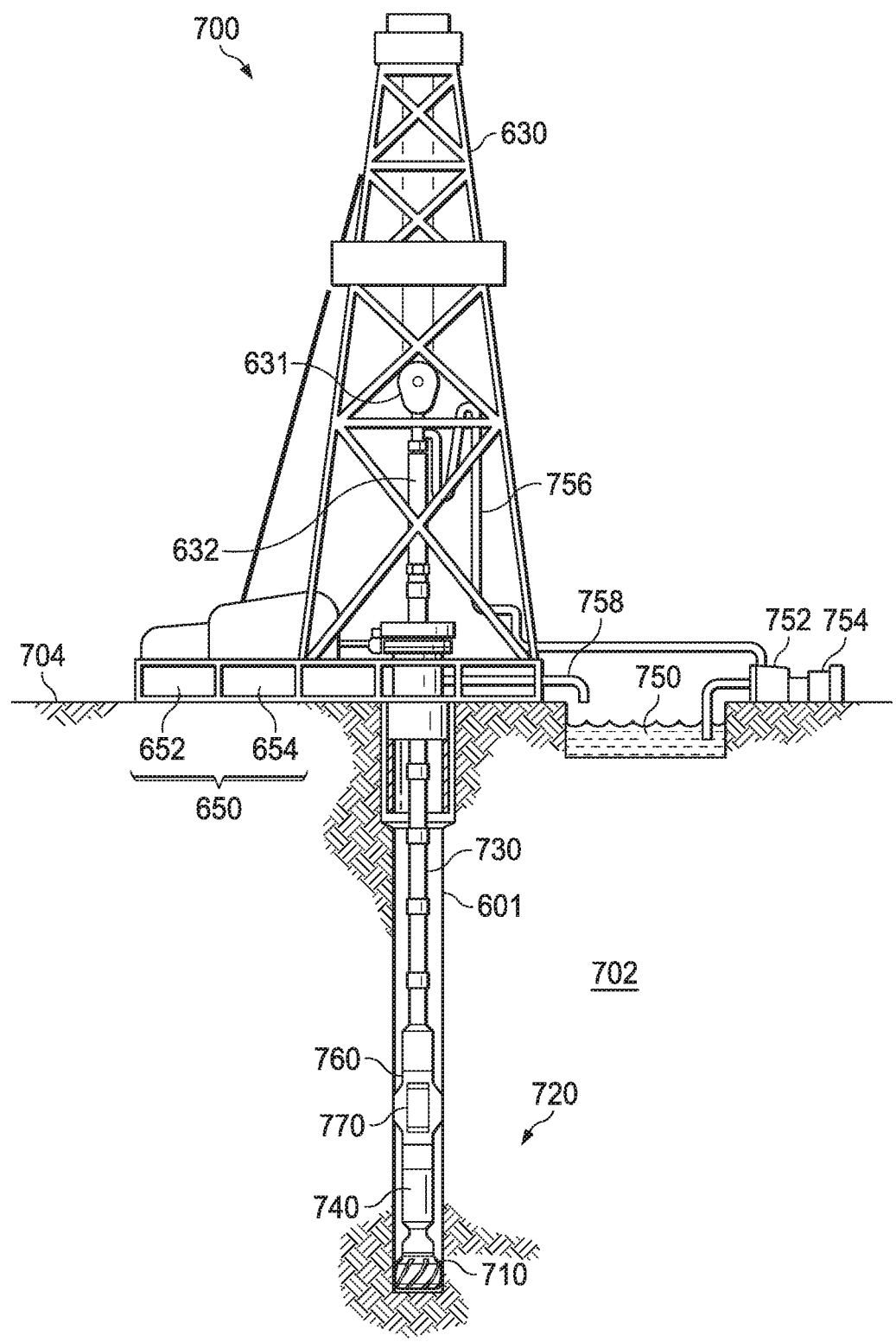

Reference is now made to the following descriptions taken in conjunction with the accompanying drawings, in which:

FIG. 1A and FIG. 1B present a flow chart for a method to determine a pore throat size distribution of reservoir rock, according to some embodiments of the disclosure;

FIG. 2 presents a sketch of an embodiment of a testing apparatus for an in situ determination of the pore throat size distribution of reservoir rock, according to the disclosure;

FIG. 3 presents a sketch of another embodiment of a testing apparatus for an in situ determination of the pore throat size distribution of reservoir rock, according to the disclosure;

FIG. 4 presents a sketch of an example elution profile of the probe particles from reservoir rock, according to some embodiments of the disclosure;

FIG. 5 presents a sketch of an example analytical module embodiment of the testing apparatus for determining the pore throat size distribution of reservoir rock, according to embodiments of the disclosure;

FIG. 6 illustrates a system diagram of a wireline system configured to use an embodiment of the testing apparatus of the disclosure; and FIG. 7 illustrates a system diagram of a logging while drilling (LWD) system configured to use an embodiment of the testing apparatus of the disclosure.

DETAILED DESCRIPTION

Embodiments of the disclosure benefit from our recognition that inverse size exclusion chromatography (ISEC) can be used to gain information about the pore throat space of reservoir rock. As disclosed herein, injecting probe particles of known sizes into and monitoring the elution of the probe particles from reservoir rock facilitates determining a pore throat size distribution of the rock and other physical parameters. As further disclosed, some embodiments can be advantageously adapted to in situ determinations.

The term "reservoir rock" as used herein refers to solid materials from any earth geologic formation for a variety of physical arrangements such as layers, rock beds, sand embankments, intentionally fractured embodiments of such formations or other formations familiar to those skilled in the pertinent arts.

As used herein, the term pore throat space refers to the narrow space between two or more, larger pore volumes in the solid materials of a formation which connects the larger pore volumes. As used herein, the term pore throat size as used herein refers to the root mean diameter of the cross-sectional area of the pore throat space. The term, "or," as used herein, refers to a non-exclusive or, unless otherwise indicated.

One embodiment is a method of determining the pore throat size distribution of reservoir rock. FIG. 1A and FIG. 1B present a flow chart for a method 100 to determine pore throat size distribution of reservoir rock, according to some embodiments of the disclosure. With continuing reference to FIG. 1A and FIG. 1B throughout, the method 100 embodiment comprises injecting a set of different-sized probe particles through a portion of reservoir rock (e.g., step 110) and measuring the retention volumes (e.g., step 120) or the retention times (e.g., step 122) of each of the different-sized probe particles eluting from the portion of reservoir rock.

In some embodiments, the probe particles can be injected (e.g., as part of step 110) through the portion of reservoir rock at a constant flow rate (e.g., step 123) and the retention times of the probe particles eluting from the portion of reservoir rock are measured (e.g., as part of step 122). For example, a pump can be programmed to pump an injection fluid containing the probe particles into the portion of reservoir rock at a constant flow rate. Or, the pump can be programmed to pump an injection fluid containing the probe particles into the portion of reservoir rock at a constant flow rate such that the probe particles in the elution fluid (e.g., injection fluid or formation fluids) exiting the portion of reservoir rock, elutes at a constant flow rate. In some such embodiments, a variable pressure may be exerted by the pump in order to achieve such constant flow rates. Injecting at a constant flow rate can facilitate monitoring the elution of the probe particles as retention times without necessarily having to measure the volumes of fluid exiting the portion of reservoir rock.

In some embodiments, for instance, the probe particles can be injected (e.g., as part of step 110) through the portion of reservoir rock at a constant flow pressure (e.g., step 124) and the retention volumes of the probe particles eluting from the portion of reservoir rock are measured (e.g., as part of step 120). For example, the pump can be programmed to pump an injection fluid containing the probe particles into the portion of reservoir rock at a constant flow pressure. In some such embodiments, a variable flow rate may be exerted by the pump in order to achieve a constant flow pressure. Injecting at a constant flow pressure facilitates performing the method 100 without subjecting the portion of reservoir rock to variable pressures which may, for some embodiments, undesirably alter the rock's physical structure.

Embodiments of the method 100 where one of the injection flow rate or flow pressure are kept constant, and the other one of flow rate or flow pressure varies, can advantageously simplify the calculation of the pore throat size distribution or other physical properties (e.g., permeability or viscosity) that can be calculated from such information. In other embodiments, however, both the injection flow rate or flow pressure can be varied, in which case, both the retention times and retention volume of each of the different-sized probe particles eluting can be measured (e.g., steps 120 and 122).

In some embodiments, the portion of reservoir rock subjected to the method 100 is an above-ground sample from a below-ground rock formation. For instance, the portion of reservoir rock can be formation cuttings or a core (e.g., rotary, percussion or chips from a core) which is taken above ground for analysis according to the method 100. The formation cutting or core can be coarsely crushed, packed into a chromatography tube and then subjected to an ISEC flow environment. For example, the set of probe particles can be injected (step 125) through the reservoir rock packed inside of the chromatography tube (e.g., as part of step 110). The elution of the probe particles from the portion of reservoir rock, can be measured (e.g., as part of steps 120, 122) by measuring the elution volume or time of the probe particles from the chromatography tube.

While some such embodiments of the method 100 provide an above-ground laboratory method to determine the pore throat size distribution of reservoir rock, other embodiments of method 100 can be applied below-ground, in situ. That is, the portion of reservoir rock remains part of a below-ground rock formation and the injection of probe particles and measurement of the retention volumes or times (e.g., as part of steps 110, 120, 122) are conducted below ground.

In some such embodiments, the injecting (e.g., as part of step 110) includes pumping the probe particles through a probe tube that interfaces with the portion of reservoir rock that is located in a below-ground rock formation (e.g., step 126). The measuring (e.g., as part of steps 120 or 122) includes reversing a direction of the injection flow (e.g., step 132) and measuring the volume or time for the probe particles to elute back from the reservoir rock portion into the same probe tube (e.g., step 135 and 137 respectively).

To further illustrate some of these aspects, FIG. 2 presents a sketch of an embodiment of a testing apparatus 200 for an in situ determination of the pore throat size distribution of reservoir rock. As illustrated, the apparatus 200 can be positioned in a wellbore 205 formed in a geologic formation 210. The apparatus 200 includes a probe tube 215 which can be moved such that an end 220 of the probe tube 215 interfaces with an outer surface 227 of the portion of the reservoir rock 225 in the formation 210. Hydraulic feet 230 and isolation pads 232 can facilitate securing the apparatus 200 and forming a tight seal of the end 220 of the probe tube 215 against the outer surface 235 of wellbore 205 so as to interface with the portion 225 and to minimize any leakage to and from the wellbore 205.

A set of probe particles 240 can be injected (e.g., as part of step 110) via a pump 245. The pump 245 can pump an injection fluid 250 containing the probe particles through the probe tube 215 that is interfaced with the portion 225 (e.g., step 126) and into the portion 225 in ingoing flow direction 255. Measuring the retention volumes or times (e.g., steps 120, 122) can include reversing a direction of the injection flow, e.g., in outgoing flow direction 260 by reversing the pump's 245 pumping operation (e.g., as part of step 132) and measuring the time or volume for the probe particles to elute back into the same probe tube 215 (e.g., step 135, 137 respectively).

Alternatively, in some such embodiments, the injection (e.g., as part of step 110) can include pumping the probe particles through a first probe tube that interfaces with the portion of reservoir rock that is located in a below-ground rock formation (e.g., step 126). The measuring (e.g., as part of steps 120 or 122) includes measuring the volume or time for the probe particles to elute into a second probe tube that is separated from the first probe tube (e.g., steps 140, 142 respectively).

To further illustrate some of these aspects, FIG. 3 presents a sketch of another embodiment of a testing apparatus 300 for an in situ determination of the pore throat size distribution of reservoir rock.

Similar to the apparatus 200 presented in FIG. 2, the apparatus 300 can be positioned in a wellbore 205 formed in a geologic formation 210. Also similarly, the apparatus 300 includes a first probe tube 215 which can be moved such that an end 220 of the probe tube 215 interfaces with a portion of the reservoir rock 225 of the formation 210. Again, hydraulic feet 230 and isolation pads 232 can facilitate securing the apparatus 300 in the wellbore 205 and forming a tight seal of the end 220 of the first probe tube 215 against the outer surface 230 of wellbore 205 and interface with the portion 225.

As further illustrated, the apparatus 300 includes a second probe tube 310 which is separated from the first probe tube 215 (e.g., by separation distance 315). Similar to the first probe tube 215, the second probe tube 310 can be moved such that an end 320 of the second probe tube 310 interfaces with the portion of the reservoir rock 225. The hydraulic feet 230 and second isolation pads 332 can facilitate securing the apparatus 300 and forming a tight seal of the end 320 of the second probe tube 310 against the outer surface 235 of wellbore 205 so as to interface with the portion 225 and to minimize any leakage to and from the wellbore 205 and between probe tubes 215, 310.

In some embodiments of the apparatus 300, instead of have two separate isolation pads 220, 332 such as depicted in FIG. 3, there can be a single unified isolation pad (e.g., an oval or other shaped pad) that encompasses both probe tubes 215, 310 to minimize any leakage to and from the wellbore 205. In some embodiments, more than two probe tubes may be used, e.g., to facilitate performing these measurements on a larger portion of the formation. In some embodiments a section of the wellbore 205 can be sealed off, e.g., by the straddle packers, e.g., again to facilitate performing these measurements on a larger portion of the formation.

The set of probe particles 240 can be injected (e.g., step 110) via a pump to flow an injection fluid 250 containing the set of probe particles 240, through the first probe tube 215 that is interfaced with the portion 225 (e.g., step 126) and into the portion 225, e.g., ingoing flow direction 255. For instance the injection fluid 250 containing the set of probe particles 240 can be pumped via pump 245a with appropriate actuation of values 333a, 333b, from one or more storage containers 335a, 335b through pipes 337 to the first probe tube 215 and into the portion 225.

In some embodiments, injecting the set of different-sized probe particles (e.g., as part of step 110) includes sequentially injecting the different-sized probe particles into the portion of reservoir rock from a smallest particle size to a largest particle size (e.g., step 127). Injecting the probe particles from smallest to largest can help mitigate premature plugging of the pore spaces in the portion of reservoir rock, which, in some embodiments, may lead to inaccurate estimates of the pore throat size distribution of the formation.

For instance, in some embodiments, the set of different-sized probe particles can include separate injection fluid portions (e.g., held in separate storage containers 335a, 335b), each fluid portion containing a single one size of the probe particles. The separate injection fluids can be sequentially injected (e.g., step 127) such that the injection fluid containing smallest sized probe particles enters the reservoir rock portion first, followed by the injection fluid containing second smallest sized probe particles, etc., until all of the probe particles of the set have been injected into the reservoir rock portion.

Alternatively, in other embodiments, the set of different-sized probe particles can be contained in a single injection fluid. The fluid's density can be adjusted so that the different-sized probe particles are at different levels in fluid (e.g., fluid layers of different viscosity values to facilitate stratification of different-sized particle) with the lightest smallest sized particles at a highest level in the fluid and the heaviest largest sized particles at a lowest level in the fluid. Sequential injection (e.g., as part of step 127) can be accomplished by pumping such a fluid, from its top level to bottom level, into the first probe tube and through the portion of rock reservoir. One skilled in the pertinent arts would understand how to take into consideration the effect of such fluid property changes on the injecting and elution process and the interpretation of the particle's elution profiles.

Alternatively, in still other embodiments, the set of different-sized probe particles can be injected (e.g., step 110) as a bulk mixture such that all of the different-sized probe particles are introduced into the portion of reservoir rock at the same time. In some such embodiments, the risk of getting inaccurate results, e.g., due to premature plugging, can be at least partially mitigated by introducing an amount of the probe particles that is less (e.g., in some embodiments, less than about 10 percent or less than about 1 percent) than the number of pore spaces present in the portion of reservoir rock.

As illustrated, in some embodiments, the set of probe particles 240 can be injected through the first lower probe tube 215 and the probe particles elute along ingoing flow direction 255 to the second upper probe tube 310 where the elution volume or time is measured (e.g., steps 140, 142). In other embodiments, however, the set of probe particles 240 can be injected through a first upper probe tube (e.g., tube 310) and the probe particles could elute to a second lower probe tube (e.g., tube 215).

In some embodiments, after measuring the retention volumes or times (e.g., steps 140, 142) the method 100 can further include reversing a pump flow (e.g., via pump 245b or 245c with appropriate actuation of values 333a, 333b) such that the elution fluid that has eluted into the second probe tube is flowed back through the second probe tube and into the portion of reservoir rock (e.g., step 150). In some such embodiments, the method 100 can further include measuring the volume or times for the probe particles to elute back into the first probe tube (e.g., step 152, 154, respectively), e.g., along back-flow direction 340.

Such measurements (e.g., steps 152, 154) can provide quality or consistency test information. For instance, the measured return of the probe particles (e.g., steps 152 or 154) can be used to confirm the inability of the formation to capture certain large sized probe particles, which in turn can provide information about the high pore space cutoff of the formation. For instance, the amounts of the different-sized probe particles returning back into the first probe tube (e.g., as measured in steps 152 or 154) relative to the amounts of the different-sized that entered the second probe tube (e.g., as measured in steps 140 or 142) can provide information about the size of fracture channels that may have been opened up by the injection (e.g., step 110).

As illustrated in FIG. 3, the end 220 of first probe tube 215 and the end 320 of the second probe tube 310 are separated from each other by a separation distance 315. The length of the separation distance 315 is proportional to the size of the portion of reservoir rock 225 that is subject to the pore throat size distribution determination of the method 100. In some embodiments, the separation distance 315 can be a value in a range from about 5 cm or greater to about 25 cm, and in some embodiments a value in a range from about 10 cm to about 15 cm, and in some embodiments about 12 cm.

The selection of the separation distance 315 is a balance between performing the method 100 on a reservoir rock portion 225 that is representative of the physical properties of the formation versus the ability to conduct the method 100 in a reasonable time period (e.g., in some embodiments, less than about 60 minutes).

For instance, while a separation distance 315 of about 2 meters may beneficially provide a larger sized portion of reservoir rock 225 subject to the method 100, it may take several hours to measure the retention volumes or times for the probe particles to elute into the second probe tube 310 (e.g., steps 140, 142). For instance, a separation distance 315 of less than about 5 cm may beneficially provide short retention volumes or times and hence faster measurement times (e.g., as part of steps 140, 142). However, a substantial portion (e.g., about 5 percent of more) of the probe particles may be retained by a mud cake lining the outer surface 227 of the wellbore 205. In such cases, the method 100 may not provide a representative measure of reservoir rock's pore throat size distribution as desired.

Some embodiments of the method 100 include providing an injection fluid containing the set of different-sized probe particles by mixing the set probe particles with a pre-injection fluid to form an injection fluid (e.g., step 160). In some embodiments, the set of probe particle are injected into the portion of reservoir rock (e.g., step 110) as part of the injection fluid. Embodiments of the pre-injection fluid are selected based on criteria such as being non-reactive with the probe particles and being free of particles having sizes that are within the range of particle sizes of the set of different-sized probe particles. In some embodiments, to minimize undesirable sedimentation or flotation, the pre-injection fluid density is selected such that the probe particles have neutral buoyancy in the fluid, thereby avoiding the need to stir the particles in the fluid prior to injection (e.g., step 110) or provide the ability to suspend the differently sized particles at different buoyancy levels in the fluid.

Non-limiting examples of pre-injection fluids include petroleum product mineral oils. For instance, in some embodiments, the pre-injection fluid includes mineral oils having a carbon range that has a value from about 12 to 60 (e.g., C12 to C60) and in some embodiments about 20 (e.g., C20). In some such embodiments, providing the injection fluid includes mixing the set of different-sized probe particles with the mineral oil pre-injection fluid (e.g., as part of step 145).

In some embodiments, the injection fluid can include drilling fluids, such as a final near-production stage drilling fluid. Using a portion of drilling fluids to form at least part of the injection fluid can have the advantage of being readily availably to the wellbore, thereby avoiding the need to transport, or to transport lesser amounts, of separate injection fluid formulations down the wellbore. In some such embodiments, providing the injection fluid (e.g., as part of step 160) includes filtering a portion of drilling fluid to provide the pre-injection fluid (e.g., step 165). Preferably the portion of drilling fluid to be used as part of the injection fluid is filtered prior to mixing with the set of probe particles.

To illustrate some of these aspects as shown in FIG. 2, in some embodiments, the testing apparatus 200 can include a filter 260 having a size cut-off that is less than the smallest-sized one of the different-sized probe particles of the set 240. The apparatus 200 can further include ports 265 and pumps (e.g., pump 245, or, in some embodiments, a different pump) to permit a portion of the drilling fluid 270 into the apparatus 200 such that it is pumped through the filter 260 (e.g., as part of step 165). The filtered drilling fluid (e.g., the pre-injection fluid) can then be mixed with the set of probe particles 240 to form the injection fluid 265 (e.g., step 160) for injection into the portion of the rock formation 225.

Some embodiments of the method 100 further include calculating a pore throat size distribution of the portion of reservoir rock based on the retention volumes or retention times measured for the different-sized probe particles (e.g., step 170).

FIG. 4 presents a sketch of an example elution profile of the probe particles from a reservoir rock portion, showing the different retention volumes or times measured for the different-sized probe particles (e.g., steps 120 or 122). For instance, after the injection of the set of probe particles (e.g., step 110; "injection volume" in FIG. 4), the largest sized particles, which only access the larger sized pore spaces, elute first from the reservoir rock with the shorter retention volume or time. Next, medium sized particles, which can access the larger and medium pore spaces, elute with an intermediate retention volume or time. Finally, small sized particles, which can access larger, medium and smaller sized pore spaces, elute with a longer shortest retention volume or time.

One skilled in the pertinent art familiar with the theoretical principles of ISEC would understand how to calculate the pore throat size distribution of the portion of reservoir rock from such retention volume or time data.

One skilled in the pertinent art would also understand how additional physical parameters of the portion of reservoir rock, such as permeability (e.g., step 175), could be calculated from other information collected as part of collection the retention volume or time data. For instance, as understood by one skilled in the pertinent art, knowledge of the injection pressure (e.g., as measured by a pressure monitor that is part of the pump 245 or a separate pressure monitor) and knowledge of the viscosity of the injection fluid can be used to determine the permeability of the portion of reservoir rock. In some embodiments, the permeability can be more accurately determined (e.g., step 175) by measuring the pressure differential between the location of the injection (e.g., via a pressure monitor in the vicinity of a first probe tube) and the location of the elution of formation fluid (e.g., via a second pressure monitor in the vicinity of a second probe tube).

Any embodiments of the method (e.g., method 100 in FIG. 1A and FIG. 1B) can be conducted out by the testing apparatus (e.g., apparatus 200 or 300 depicted in FIGS. 2 and 3 respectively). The testing apparatus comprises a probe tube (e.g., probe tube 215 or 310) for receiving a set of different-sized probe particles 240 in an elution fluid returning from a portion of reservoir rock 225. The testing apparatus also comprises an analytical module (e.g., module 280) connected to receive the elution fluid from the probe tube. As illustrated in FIG. 5, some embodiments of the analytical module 280 include a flow cell (e.g., cell 510) to receive the particle-containing elution fluid (e.g., fluid 512) from the probe tube 215, a radiation source (e.g., source 515) positioned to direct a radiation beam (e.g., beam 520) though a window (e.g., window 525) of the cell into the fluid eluting 512 in the cell 510, and a sensor (e.g., sensor 530) for detecting (e.g., through window 535) portions of the radiation beam that have interacted with the different-sized probe particles (e.g., beam portion 540) such that that retention volumes or times of each of the probe particles of one size class can be distinguished from all of other different size classes of the set 240. The radiation source 515 can be any device configured to emit the radiation beam 520 as any number of forms of electromagnetic radiation (e.g., one or more of radio, microwave, terahertz, infrared, visible, or ultraviolet wavelengths).

In some embodiments, the radiation source 515 (e.g., a white light source) can include adjustable wavelength filters 545 (e.g., narrow band filters) to select a wavelength range for the radiation beam 520. In some embodiments, the sensor 535 can include adjustable wavelength filters 550 (e.g., narrow band filters) to select a wavelength range for detection of the radiation beam portion 540 that has interacted with the particles of the set 240.

One skilled in the pertinent art would understand how the wavelength and the intensity of the portions of the radiation beam portion 540 that have interacted with the different-sized probe particles of the set 240 as it elutes through the module 280 could be used to generate elution profiles of the probe particles from reservoir rock such as illustrated in FIG. 4, and to use such information to determine the pore throat size distribution or other physical parameters (e.g., steps 170 and 175).

The analytical module 280 and the set of probe particles 240 can be configured in a number of different fashions (or in multiple fashions) to facilitate detecting the eluting particles.

In some embodiments, the radiation source 515 can be configured to direct the radiation beam at a wavelength that causes different photo-luminescent groups of different-sized probe particles in each of the classes to fluoresce light at different wavelengths. For example, in some embodiments, the different-sized probe particles can be composed of different sized polystyrene spheres having unique fluorescent dyes inside the polystyrene sphere. For example, in some embodiments the radiation source filter 545 can be configured to allow a short wavelength range radiation beam 520 pass into fluid 512 and the sensor filter 550 filter can be configured block such a short wavelength range but allow a longer wavelength range, corresponding to fluorescence wavelengths of the dyes, to pass into the sensor 530.

In some embodiments, the different-sized probe particles in each of the size classes have different refractive indexes that cause unique refractance of the radiation beam to refract the portions of the radiation beam 540 at different wavelengths. For example, the different-sized probe particles can be composed of different sized diamonds (or other types of refractive particles) which have different refractive indexes.

In some embodiments, the different-sized probe particles in each of the size classes have different light scattering characteristics that cause unique light scattering of the radiation beam to refract the portions of the radiation beam at different wavelengths. For example the different-sized probe particles can be composed of different sized silver particles (or other types of particles) having different large effective cross-sectional areas, and hence different light scattering characteristics.

In some embodiments, the set of different-sized probe particles range in size corresponding to a root mean diameter ranging from about 0.1 microns to 100 microns. For example, in some embodiments, the set 240 may include five different classes of size each having root mean diameter of about 0.1 microns, about 1 micron, about 5 microns, about 10 microns and about 30 microns, respectively. To obtain more accurate determinations of pore throat size distribution, the size ranges of the different size classes in the set may be adjusted depending on the type of reservoir rock being tested. For example, for sandstone reservoir rock, particles of a larger size range may be selected for the set with the expectation that the pore throat diameter of sandstone formations can be relatively large (e.g., about 10 to 100 microns for some embodiments). For example, for carbonate reservoir rock, particles of a smaller size range may be selected for the set with the expectation that the pore throat diameter of carbonate formations can be relatively small (e.g., about 1 to 10 microns for some embodiments).

In some embodiments, the set of different-sized probe particles can be detected and measured according to their radioactive, electrical, or magnetic properties. For example, hematite particles can be detected with magneto-phoretic methods. For example, charged particles (e.g., charged polymeric particles) can be detected using electrophoretic methods. For example, radioactive particles can be detected with radioactivity detectors.

As illustrated in FIG. 3, in some embodiments of the apparatus 300, to facilitate in situ testing the set of different-sized probe particles 240 are in an injection fluid 250 held in one or more storage containers of the apparatus (e.g., containers 335a, 335b). The one or more delivery containers can be coupled to an injection pump 245a configured to inject the injection fluid through the portion of reservoir rock 225. In some embodiments, the set of different-sized probe particles 240 can include separate injection fluid portions held in separate storage containers 335a, 335b. In some embodiments, the set of different-sized probe particle 240 can be buoyantly held at different levels in the same container (e.g., one of containers 335a, 335b), e.g., using an injection fluid having about the same neural buoyancy and the density as the particles.

As illustrated in FIG. 2, in some embodiments of the apparatus 200, the injection pump 245 can be configured to inject the injection fluid through the probe tube 215 and then the injection pumps' 245 pump flow direction can be reversed so that the elution fluid eluted back into the probe tube 215 and to the analytical module 280. In some embodiment, the apparatus can further including a filter 260 having size cut-off that is less than a smallest-sized one of the different-sized probe particles of the set 240. The filter 260 can be configured to filter a portion of drilling fluid 270 that is allowed to enter through a port 265 of the apparatus 200, and a filtered portion of the drilling fluid can be included as part of the injection fluid.

As illustrated in FIG. 3, some embodiments of the apparatus 300, further including a second probe tube 310 configured to deliver an injection fluid 250 with the set of different-sized probe particles 240 to the portion of reservoir rock 225 (e.g., via pump 245a. In some such embodiments, a second analytical module 282 connected to the second probe tube is configured to receive a back flow of the injection fluid and the elution fluid such as discussed in the context of steps 152, 154.

As illustrated in FIG. 3 embodiments of the apparatus 300 can include interconnecting interchangeable segments (e.g., pump segment 340, analysis segment 342, pump segment 344, interconnecting segment 346, storage segments 348, 350) as part of a downhole measurement tool or logging-while-drilling tool.

FIG. 6 illustrates a system diagram of a wireline system 600 configured to use an embodiment of the testing apparatus of the disclosure. After drilling of a wellbore 601 is complete, it may be desirable to know more details of types of formation fluids and the associated physical properties through sampling with use of a wireline formation testing apparatus.

The wireline system 600 may include a wireline tool 610 that forms part of a wireline logging operation that can include at least one testing apparatus 620 (such as or at least similar to the testing apparatuses 200, 300 discussed in the context of FIGS. 2 and 3, respectively) e.g., as part of a downhole measurement tool. The wireline system 600 may include a derrick 630 that supports a traveling block 631, and the wireline tool 610, such as a probe or a sonde, may be lowered by wireline or logging cable 633 into a wellbore 601. The wireline tool 610 may be lowered to the bottom of the region of interest and subsequently pulled upward to test other regions of interest. The wireline tool 610 may be configured to measure fluid properties of the wellbore fluids and physical properties of the reservoir rock, and any measurement data generated by wireline tool 610 and the one or more testing apparatuses 620 can be communicated to a surface logging facility 640 for storage, processing, and/or analysis. Embodiments, the wireline tool 610 can be configured to measure the physical properties of reservoir rock surrounding wellbore 601, as disclosed herein.

Logging facility 640 may be provided with electronic equipment 644, including processors for various types of signal processing. The wireline system 600 may further include a controller 650 having a processor 652 and a memory 654. Controller 650, processor 652, and memory 654. Accordingly, memory 654 can be configured to store commands which, when executed by processor 652 cause controller 650 to perform steps consistent with methods as disclosed herein (e.g., method 100 in FIG. 1A and FIG. 1B).

FIG. 7 illustrates a system diagram of a logging while drilling (LWD) system 700 configured to use an embodiment of the testing apparatus of the disclosure during formation drilling. Wellbore 601 may be created by drilling into the earth 602 using drilling tool. LWD system 700 may be configured to drive bottom hole assembly (BHA) 720 positioned or otherwise arranged at the bottom of a drill string 730 extended into the earth 702 from derrick 630 arranged at the surface 704. Derrick 630 includes a kelly 632 and a traveling block 631 used to lower and raise the kelly 632 and drill string 730.

The BHA 720 may include a drill tool 710 operatively coupled to a tool string 740 which may be moved axially within wellbore 601 as attached to the tool string 740. During operation, the drill tool 710 penetrates the earth 702 and thereby creates wellbore 601. The BHA 720 provides directional control of drill tool 710 as it advances into earth 702. Tool string 740 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within drill string 730.

Fluid or "drilling mud" from a mud tank 750 may be pumped downhole using a mud pump 752 powered by an adjacent power source, such as a prime mover or motor 754. The drilling mud may be pumped from mud tank 750, through a stand pipe 756, which feeds the drilling mud into drill string 730 and conveys the same to drill tool 710. The drilling mud exits one or more nozzles arranged in drill tool 710 and in the process cools drill tool 710. After exiting drill tool 710, the mud circulates back to the surface 704 via the annulus defined between the wellbore 601 and the drill string 730, and in the process, returns drill cuttings and debris to the surface. The cuttings and mud mixture are passed through a flow line 758 and are processed such that a cleaned mud is returned down hole through the stand pipe 756 once again. BHA 720 may further include an LWD tool 760. LWD tool 760 may include a sensor that incorporates the use of a testing apparatus 770, such as described herein. The LWD tool 760 may be positioned between drill string 730 and drill tool 710.

A controller 650, including a processor 652 and a memory 654, is communicatively coupled to testing apparatus 770 (such as or at least similar to the testing apparatuses 200, 300 discussed in the context of FIGS. 2 and 3, respectively) in the LWD tool 760. While the testing apparatus 770 may be placed at the bottom of wellbore 601, and extend for a few inches, a communication channel may be established by using electrical signals or mud pulse telemetry for most of the length of tool string 730 from drill tool 710 to controller 650. Memory 654 includes commands which, when executed by processor 652 cause controller 650 to perform steps in methods consistent with the present disclosure. The processor 652 and the memory 654 can least partially be implemented at the surface, downhole or at a remote operating center. More specifically, controller 650 may provide commands to and receive data from the testing apparatus 770 during operation. For example, in some embodiments, controller 650 may receive information from testing apparatus 670 about drilling conditions in wellbore 601 and controller 650 may provide a command to BHA 720 to modify certain drilling parameters. For example, controller 650 may provide a command to adjust or change the drilling direction of drill tool 710 based on a message contained in information provided by the testing apparatus 770. In that regard, the information provided by the testing apparatus 770 to controller 650 may include certain drilling conditions such as physical properties of the reservoir rock in the subterranean environment.

Accordingly, controller 650 may use processor 652 to determine a characteristic of the reservoir rock surrounding drill tool 710 using the data collected from the testing apparatus 770. Wireline tool 610 and LWD tool 760 may be referred to as a downhole tool.

Those skilled in the art to which this application relates will appreciate that other and further additions, deletions, substitutions and modifications may be made to the described embodiments.

What is claimed is:

1. A method of determining a pore throat size distribution of reservoir rock, the method comprising:
    injecting a set of different-sized probe particles through a portion of reservoir rock, the injecting includes pumping the probe particles through a probe tube that interfaces with the portion of reservoir rock that is located in a below-ground rock formation;
    measuring retention volumes or retention times of each of the different-sized probe particles eluting from the portion of reservoir rock, the measuring includes reversing a direction of the injection flow and measuring the time or volume for the probe particles to elute back into the probe tube; and
    calculating the pore throat size distribution of the reservoir rock based on the retention volumes or the retention times measured for the different-sized probe particles using inverse size exclusion chromatography.

2. The method of claim 1, wherein the injecting includes pumping the probe particles through the portion of reservoir rock at a constant flow rate and the measuring includes measuring the retention times of the probe particles eluting from the portion of reservoir rock.

3. The method of claim 1, wherein the injecting includes pumping the probe particles through the portion of reservoir rock at a constant flow pressure and the measuring includes measuring the retention volumes of the probe particles eluting from the portion of reservoir rock.

4. The method of claim 1, wherein the injecting includes sequentially pumping the different-sized probe particles into the portion of reservoir rock from a smallest particle size to a largest particle size.

5. The method of claim 1, wherein the portion of reservoir rock is an above-ground sample from a below-ground rock formation.

6. The method of claim 1, wherein the portion of reservoir rock is part of a below-ground rock formation.

7. The method of claim 1, further including providing an injection fluid containing the set of probe particles by mixing the set probe particles with a pre-injection fluid, wherein the set probe particles are injected into the portion of reservoir rock as part of the injection fluid.

8. The method of claim 7, wherein providing the injection fluid includes filtering a portion of drilling fluid to provide at least a portion of the pre-injection fluid.

9. A method of determining a pore throat size distribution of reservoir rock, the method comprising
    injecting a set of different-sized probe particles through a portion of reservoir rock, the injecting includes pumping the probe particles through a first probe tube that interfaces with the portion of reservoir rock that is located in a below-ground rock formation;
    measuring retention volumes or retention times of each of the different-sized probe particles eluting from the portion of reservoir rock, the measuring includes measuring the time or volume for the probe particles to elute into a second probe tube that is separated from the first tube and interfaces with the portion of reservoir rock; and
    calculating the pore throat size distribution of the reservoir rock based on the retention volumes or the retention times measured for the different-sized probe particles using inverse size exclusion chromatography.

10. The method of claim 9, further including:
    reversing a pump flow such that fluid that has eluted into the second probe tube is flowed back through the second probe tube and into the portion of reservoir rock; and
    measuring the time or volume for the probe particles to elute back into the first probe tube.

11. A testing apparatus for determining a pore throat size distribution of reservoir rock, the apparatus comprising:
    a probe tube for receiving a set of different-sized probe particles in an elution fluid returning from a portion of reservoir rock; and
    an analytical module connected to receive the elution fluid from the probe tube, the analytical module including:
        a flow cell to receive the elution fluid from the probe tube;

a radiation source positioned to direct a radiation beam though a window of the cell into the eluting fluid in the cell; and a sensor for detecting portions of the radiation beam that have interacted with the different-sized probe particles such that retention volumes or times each of the different-sized probe particles of one size class can be distinguished from all other size classes of the set.

12. The apparatus of claim 11, wherein the radiation source is configured to direct the radiation beam at a wavelength that causes different photo-luminescent groups of different-sized probe particles in each of the size classes to fluoresce light at different wavelengths.

13. The apparatus of claim 11, wherein the different-sized probe particles in each of the classes have different refractive indexes that cause unique refractance of the radiation beam to refract the portions of the radiation beam at different wavelengths.

14. The apparatus of claim 11, wherein the different-sized probe particles in each of the size classes have different light scattering characteristics that cause unique light scattering of the radiation beam to refract the portions of the radiation beam at different wavelengths.

15. The apparatus of claim 11, wherein the set of different-sized probe particles range in size corresponding to a root mean diameter ranging from about 0.1 microns to 100 microns.

16. The apparatus of claim 11, wherein the set of different-sized probe particles are in an injection fluid held in one or more storage containers of the apparatus, the one or more storage containers coupled to an injection pump configured to inject the injection fluid through the portion of reservoir rock.

17. The apparatus of claim 11, further including a filter having size cut-off that is less than a smallest-sized one of the different-sized probe particles of the set, the filter configured to filter a portion of drilling fluid allowed to enter through a port of the apparatus, wherein a filtered portion of the drilling fluid is included as part of the injection fluid.

18. The apparatus of claim 11, further including a second probe tube, the second probe tube configured to deliver an injection fluid with the set of different-sized probe particles to the portion of reservoir rock.

19. The apparatus of claim 11, further including a second one of the analytical module connected to a second probe tube, the second analytical module configured to receive a back flow of the injection fluid and the elution fluid.

* * * * *